US009847176B2

(12) United States Patent
Albertsen et al.

(10) Patent No.: US 9,847,176 B2
(45) Date of Patent: Dec. 19, 2017

(54) DIELECTRIC MATERIAL AND CAPACITOR COMPRISING THE DIELECTRIC MATERIAL

(71) Applicant: SYFER TECHNOLOGY LIMITED, Norwich (GB)

(72) Inventors: Knuth Albertsen, Uden (NL); Angela Ellmore, Norwich (GB)

(73) Assignee: KNOWLES (UK) LIMITED, Norwich (GB)

(*) Notice: Subject to any disclaimer, the term of this patent is extended or adjusted under 35 U.S.C. 154(b) by 0 days.

(21) Appl. No.: 15/120,478

(22) PCT Filed: Feb. 19, 2015

(86) PCT No.: PCT/EP2015/053549
§ 371 (c)(1),
(2) Date: Aug. 19, 2016

(87) PCT Pub. No.: WO2015/124698
PCT Pub. Date: Aug. 27, 2015

(65) Prior Publication Data
US 2017/0069427 A1    Mar. 9, 2017

(30) Foreign Application Priority Data

Feb. 21, 2014  (GB) .................................. 1403117.3

(51) Int. Cl.
*H01G 4/30*  (2006.01)
*C04B 35/47*  (2006.01)
(Continued)

(52) U.S. Cl.
CPC .............. *H01G 4/30* (2013.01); *B32B 18/00* (2013.01); *C04B 35/47* (2013.01); *C04B 35/64* (2013.01);
(Continued)

(58) Field of Classification Search
CPC ......... C04B 35/47; C04B 35/20; C04B 35/26; C04B 14/363
See application file for complete search history.

(56) References Cited

U.S. PATENT DOCUMENTS 6,607,934 B2 * 8/2003 Chang ................. B81C 1/00246
                                                      438/119
7,358,207 B2 * 4/2008 Tamura ................... C04B 35/20
                                                      361/321.4
(Continued)

OTHER PUBLICATIONS

International Search Report and Written Opinion for Application No. PCT/EP2015/053549, dated May 4, 2015 in 8 pages.
(Continued)

*Primary Examiner* — Noah S Wiese
(74) *Attorney, Agent, or Firm* — Knobbe, Martens, Olson & Bear, LLP (57) ABSTRACT

A dielectric material suitable for use in an electronic component includes bismuth ferrite, strontium titanate and an additive. The additive comprises barium titanate. The barium titanate reduces the temperature capacitance change of the dielectric material and allows for increased working voltages. The material is useful for the construction of capacitors, and particularly capacitors intended for use at high temperatures. Also provided are a capacitor including the dielectric material, methods of manufacturing the dielectric material and the capacitor, and the use of an additive to improve the lifetime and/or reduce the dissipation factor of a capacitor.

26 Claims, 7 Drawing Sheets

(51) Int. Cl.
*H01G 4/12* (2006.01)
*B32B 18/00* (2006.01)
*C04B 35/64* (2006.01)
*H01G 4/005* (2006.01)
*H01G 4/248* (2006.01)

(52) U.S. Cl.
CPC ........... *H01G 4/005* (2013.01); *H01G 4/1227* (2013.01); *H01G 4/248* (2013.01); *C04B 2235/3208* (2013.01); *C04B 2235/3213* (2013.01); *C04B 2235/3215* (2013.01); *C04B 2235/3224* (2013.01); *C04B 2235/3236* (2013.01); *C04B 2235/3251* (2013.01); *C04B 2235/3262* (2013.01); *C04B 2235/3274* (2013.01); *C04B 2235/3275* (2013.01); *C04B 2235/3284* (2013.01); *C04B 2235/3296* (2013.01); *C04B 2235/3298* (2013.01); *C04B 2235/3409* (2013.01); *C04B 2235/3418* (2013.01); *C04B 2235/6025* (2013.01); *C04B 2235/656* (2013.01); *C04B 2235/80* (2013.01); *C04B 2235/96* (2013.01); *C04B 2237/346* (2013.01); *C04B 2237/68* (2013.01); *C04B 2237/704* (2013.01); *Y02T 10/7022* (2013.01)

(56) References Cited

U.S. PATENT DOCUMENTS

| | | | |
|---|---|---|---|
| 7,502,631 B2* | 3/2009 | Hashemi | H01Q 3/22 455/273 |
| 7,781,357 B2* | 8/2010 | Abe | C04B 35/20 501/122 |
| 2005/0212615 A1* | 9/2005 | Liang | H01P 1/181 333/24 C |
| 2010/0135937 A1 | 6/2010 | O'Brien et al. | |
| 2011/0007115 A1 | 1/2011 | Kobayashi et al. | |
| 2011/0074249 A1 | 3/2011 | Sakashita | |
| 2011/0241091 A1* | 10/2011 | Dubourdieu | H01L 21/28291 257/295 |

OTHER PUBLICATIONS

Search and Examination Report for Application No. GB1403117.3, dated Jul. 30, 2015 in 6 pages.

* cited by examiner

DIELECTRIC MATERIAL AND CAPACITOR COMPRISING THE DIELECTRIC MATERIAL

TECHNICAL FIELD

The present invention provides a dielectric material, a capacitor comprising the dielectric material, and methods of manufacturing the dielectric material and the capacitor.

BACKGROUND

Capacitors used in certain applications, particularly within the automotive, aerospace and oil and gas industries might routinely be exposed to temperatures of up to 200° C. The capacitance of conventional capacitors varies considerably with temperature, rendering them unsuitable for use in high temperature environments. It is therefore desirable to provide a capacitor with improved high temperature performance.

Capacitance may also vary with the applied voltage. For example, a conventional capacitor with a nominal capacitance of 100 nF may in fact operate at only 20 nF when a voltage is applied. It is desirable to provide a capacitor with reduced sensitivity to the effects of the applied voltage.

Low dissipation factor (or loss) is a useful characteristic for capacitors, particularly when used for AC applications. This property has however generally been restricted to low capacitance COG type capacitors and has not been available in a higher capacitance X7R or X8R ranges.

Various attempts have been made to provide capacitors with improved performance at high temperature.

International Patent Application Publication No. WO2013/144637 provides a high capacity capacitor which includes a spacer element formed of a high energy density dielectric material. The dielectric material comprises doped bismuth ferrite. The doping agent includes strontium and titanium. The doping agent has the effect of increasing the difference between the saturation polarisation and the remnant polarisation of bismuth ferrite as well as reducing charge leakage, making bismuth ferrite a suitable material for a high energy density capacitor. The doped bismuth ferrite exhibits good temperature stability.

Various attempts have also been made to improve the reliability of conventional capacitors.

International Patent Application Publication No. WO2013/186172 provides a capacitive structure comprising first and second components, at least one component comprising a plurality of capacitive layers of a dielectric, each layer arranged between electrodes of different polarity, wherein the first and second components are arranged in a stack separated by a stress reducing layer having a supporting structure with an open mesh in which air acts to reduce the transmissibility of cracks through the stress reducing layer.

The present invention aims to provide a capacitor with improved efficiency, lower loss and a smaller sensitivity to temperature and the applied voltage.

SUMMARY OF THE INVENTION

In one aspect, the present invention provides a dielectric material according to claim 1. The dielectric material is suitable for use in an electronic component. The dielectric material comprises bismuth ferrite, strontium titanate and an additive. The additive comprises barium titanate.

In another aspect, the present invention provides a capacitor according to claim 18. The capacitor comprises a first electrode, a second electrode, and a capacitive layer disposed between the first electrode and the second electrode. The capacitive layer comprises the dielectric material of the invention.

In a still further aspect, the present invention provides a method of manufacturing a dielectric material according to claim 36. The method comprises providing a powder composition and sintering the powder composition to form the dielectric material. The powder composition comprises bismuth ferrite, strontium titanate and an additive. The at least one additive comprises barium titanate.

In another aspect, the present invention provides a method of manufacturing a capacitor according to claim 57. The method comprises providing a first electrode, depositing a slurry comprising a powder composition for forming a capacitive layer, depositing a second electrode and sintering the resulting structure to form the capacitor. The powder composition comprises bismuth ferrite, strontium titanate and an additive. The additive comprises barium titanate.

In another aspect, the present invention provides a use according to claim 85. The invention provides the use of an additive to improve the lifetime and/or to reduce the dissipation factor of a capacitor. The additive is a component of a dielectric material provided in a capacitive layer of the capacitor. The capacitive layer comprises strontium titanate and bismuth ferrite. The additive comprises barium titanate.

Further areas of applicability of the present invention will become apparent from the description provided hereinafter. It should be understood that detailed descriptions of specific examples, while indicating the preferred embodiments of the present invention, are intended for purposes of illustration only and are not intended to limit the scope of the invention. The scope of the invention is defined by the appended claims.

BRIEF DESCRIPTION OF THE DRAWINGS

Embodiments of the present invention are described below, with reference to the accompanying drawings, in which.

DETAILED DESCRIPTION

Unless otherwise specified, all percentages and amounts expressed herein and elsewhere in the specification should be understood to refer to percentages by weight.

It will be appreciated that the measurement of the numerical values expressed herein may be subject to experimental uncertainty. Numerical values may be measured to within ±10%, and preferably to within ±1%.

In one aspect, the present invention provides a dielectric material which is suitable for use in an electronic component. The dielectric materials of the invention are particularly well adapted for use in the capacitive layer of a capacitor.

It is desirable to provide capacitors with high energy density. The ability of a capacitor to store charge is largely governed by the properties of the dielectric material present in the capacitor.

When a material is exposed to an electric field, it becomes polarised. It is desirable for a dielectric material to be highly polarisable. Relative permittivity K (i.e. the permittivity of the material relative to the permittivity of a vacuum) is a dimensionless parameter which provides a measure of the ability of a material to become polarised. As used herein, the terms "relative permittivity" and "dielectric constant" are interchangeable. Dielectric materials desirably have a high K.

The relative permittivity of a material in a static electric field (i.e. exposed to a DC current) is termed static relative permittivity. The relative permittivity of a material in an AC electric field is a function of the frequency of the electric field. K values reported herein were measured using a capacitance meter operating at an alternating electric field frequency of 1 kHz and a root mean square voltage of 1 V. The voltage applied to the capacitor was 0 V.

K values may vary with temperature. Unless otherwise specified, in the context of the present invention K values are measured at room temperature (about 20 to 25° C.).

The ability of a capacitor to store charge varies depending on the applied voltage. In the context of the present invention, the response of a capacitor to an applied voltage is quantified by its residual K.

Residual K is obtained by multiplying the change in capacitance at a given voltage by the K measured at 0 volts. Residual K may be calculated as follows:

$$\text{Residual } K = K_0 X \frac{C_V}{C_0}$$

Where $C_V$ is the capacitance of the capacitor measured at an applied voltage of V volts per micron, and $C_0$ is the capacitance of the capacitor measured at 0 volts.

For example, a capacitor with a K of 3000 which loses 50% of its capacitance at an applied voltage of V would have residual K of 1500.

The dielectric material of the invention comprises bismuth ferrite, strontrium titanate and additive. The additive comprises barium titanate.

In the absence of additives or dopants, bismuth ferrite ($BiFeO_3$) has a high remanent polarisation. The inclusion of a strontium titanate ($SrTiO_3$) dopant in the dielectric material reduces the remanent polarisation, and hence improves the energy storage capability of the material.

Surprisingly, it has been found that the inclusion of barium titanate ($BaTiO_3$) further enhances the properties of the dielectric material. In particular, barium titanate reduces the temperature capacitance change of the material and allows for increased working voltages.

The inclusion of barium titanate may bring the material into line with the requirements of the X7R or X8R specifications. As used herein, the terms X7R and X8R are as defined by the EIA. An X7R capacitor maintains its capacitance to within 15% of its room temperature value up to 125° C. An X8R capacitor maintains its capacitance to within 15% of its room temperature value at 150° C.

The dielectric materials of the present invention may be ceramic materials.

The amounts of bismuth ferrite, strontium titanate and the additive present in the material may be selected depending on the desired use of the material. It is believed that varying the relative amount of the additive will influence the response of the dielectric material to changes in temperature. Temperature response can be investigated by constructing a capacitor comprising the dielectric material, and measuring the capacitance of the capacitor as a function of temperature.

Strontium titanate may be present in the material in an amount in the range 45% to 75% by weight, and preferably 55% to 65% by weight.

Bismuth ferrite may be present in the material in an amount of at least 5% by weight of the composition, preferably in an amount in the range 10% to 50% by weight, and most preferably 20% to 30% by weight.

Barium titanate may be present in the material in an amount of up to 50% by weight. Preferably, barium titanate is present in the material in an amount in the range 5% to 25% by weight, and more preferably 18% to 22% by weight.

The dielectric materials of the invention optionally comprise one or more further additives.

Manganese is a particularly preferred further additive. Manganese has been found to enhance further the properties of the dielectric material. Manganese may be present in the material in an amount of at least 0.1% by weight, and preferably in an amount in the range 0.25% to 0.75% by weight, more preferably 0.4% to 0.6% by weight. Most preferably, manganese is present in an amount of about 0.5% by weight.

The manganese is optionally in the form of manganese carbonate, manganese oxide, or the like.

The one or more further additives optionally comprise one or more additives selected from the additives used in the capacitive layer of X7R or X8R capacitors.

One of skill in the art will be familiar with the formulation of X7R and X8R materials. Non-limiting examples of additives used in X7R and X8R materials are provided below. It will of course be appreciated that other X7R or X8R additives may be used.

X7R and X8R materials may comprise a rare earth metal. The term "rare earth metal" refers to a metal selected from scandium, yttrium, lanthanum, cerium, praseodymium, neodymium, promethium, samarium, europium, gadolinium, terbium, dysprosium, holmium, erbium, thulium, ytterbium and lutetium. The rare earth metal is preferably neodymium.

Other components present used in X7R or X8R materials include cobalt, magnesium, zinc, boron, calcium, and niobium.

The further additives may be supplied as oxides, carbonates, or the like. The amounts of the further additives may be adjusted to adapt the properties of the dielectric material.

For example, a rare earth metal may be present in the dielectric material in an amount of less than 5% by weight of the composition. Preferably, the rare earth metal is present in an amount of 0.2 to 1.5% by weight.

Preferably, the dielectric materials of the invention do not comprise lead.

Various combinations of further additives may be present in the dielectric materials of the invention. The further additives may be selected to adjust the properties of the dielectric material.

In one embodiment, the further additives comprise neodymium and magnesium. Preferably, the neodymium is present in the dielectric material in an amount in the range 0.2% to 1.5% by weight. Preferably, the magnesium is present in the dielectric material an amount in the range 0.2 to 1.5% by weight.

In another embodiment, the further additives comprise neodymium, niobium, zinc, and silicon. In another embodiment, the further additives comprise niobium, bismuth, calcium, and silicon.

Preferably, the dielectric materials of the invention are hybrid materials. Hybrid materials are prepared by preparing powders of at least two dielectric materials, blending the powders, and sintering the resulting mixture. The first dielectric material may comprise bismuth ferrite and strontium titanate. The second dielectric material may be an X7R material or an X8R material. The X7R or X8R materials useful in the practice of the present invention comprise barium titanate.

In a preferred embodiment, the sintering step is carried out as a part of a method for manufacturing a capacitor comprising the dielectric material of the invention, such that the dielectric material is formed in situ. In this embodiment, the sintering step may also be used to form the electrodes of the capacitor. Optionally, the powders are blended with a carrier, to allow the powders to be deposited by, for example, screen printing. One of skill in the art will be familiar with suitable carriers for screen printing processes.

In one embodiment, the dielectric material comprises about 67% strontium titanate, about 22.5% bismuth ferrite, about 10% barium titanate, and about 0.5% manganese.

In another embodiment, the dielectric material comprises about 67% strontium titanate, about 22.5% bismuth ferrite, 0.5% manganese, and 10% of an X7R composition. The X7R composition may comprise 94% barium titanate, 2% niobium oxide, 1.5% bismuth oxide, 1% calcium carbonate, 1% manganese carbonate, and 0.5% silicon oxide. Alternatively, the X7R composition may comprise about 94% barium titanate, about 2.5% neodymium oxide, about 1.5% zinc oxide, about 1% niobium oxide and about 1% silicon oxide. Preferably, the dielectric material of this embodiment is a hybrid dielectric material.

In another embodiment, the dielectric material comprises about 63% strontium titanate, about 26.6% bismuth ferrite, about 0.4% manganese, and about 10% of an X7R composition. The X7R composition may comprise about 94% barium titanate, about 2% niobium oxide, about 1.5% bismuth oxide, about 1% calcium carbonate, about 1% manganese carbonate, and about 0.5% silicon oxide. Alternatively, the X7R composition may comprise about 94% barium titanate, about 2.5% neodymium oxide, about 1.5% zinc oxide, about 1% niobium oxide and about 1% silicon oxide. Preferably, the dielectric material of this embodiment is a hybrid dielectric material.

In a still further embodiment, the dielectric material comprises about 56% strontium titanate, about 23.6% bismuth ferrite, about 0.4% manganese, and about 20% of an X7R composition. The X7R composition may comprise about 94% barium titanate, about 2% niobium oxide, about 1.5% bismuth oxide, about 1% calcium carbonate, about 1% manganese carbonate, and about 0.5% silicon oxide. Alternatively, the X7R composition may comprise about 94% barium titanate, about 2.5% neodymium oxide, about 1.5% zinc oxide, about 1% niobium oxide and about 1% silicon oxide. Preferably, the dielectric material of this embodiment is a hybrid dielectric material.

In another embodiment, the dielectric material comprises about 65.6% strontium titanate, about 24% bismuth ferrite, about 0.4% manganese and about 10% of an X7R composition. The X7R composition may comprise about 94% barium titanate, about 2% niobium oxide, about 1.5% bismuth oxide, about 1% calcium carbonate, about 1% manganese carbonate, and about 0.5% silicon oxide. Alternatively, the X7R composition may comprise about 94% barium titanate, about 2.5% neodymium oxide, about 1.5% zinc oxide, about 1% niobium oxide and about 1% silicon oxide. Preferably, the dielectric material of this embodiment is a hybrid dielectric material.

The present invention provides a method of manufacturing a dielectric material. The method comprises the steps of preparing a powder mixture and sintering the mixture to form the dielectric material. The powder mixture comprises strontium titanate, bismuth ferrite and at least one additive. The at least one additive comprises barium titanate.

Preferably, the dielectric material is formed in situ during the manufacture of a capacitor.

Sintering involves heating particulate materials to a temperature below the melting point of the material, thereby fusing the particles through atomic diffusion. Sintering techniques are known in the art. In the methods of the invention, sintering is preferably performed at a temperature in the range 950 to 1150° C.

The particle size of the powder may be any particle size which is compatible with the sintering process. As used herein, the term "particle size" refers to average particle diameter as measured by laser diffraction spectroscopy. Typically, the particle sizes will be in the range 10 nm to 5 μm, and preferably 200 nm to 2 μm.

The powder mixture may comprise a powder of strontium titante, a powder of bismuth ferrite, and a powder of the at least one additive. Alternatively, the powder mixture may comprise a powder of a dielectric material comprising strontium titanate and bismuth ferrite, and a powder of the at least one additive.

The amounts of barium titanate, strontium titanate, and bismuth ferrite may vary.

Barium titanate is typically present in the powder composition in an amount of up to 50% by weight, preferably 5% to 25% by weight, most preferably 18% to 22% by weight.

Strontium titanate is typically present in the powder composition in an amount in the range 45% to 75% by weight, and preferably 55% to 65% by weight.

The powder composition preferably comprises manganese. Manganese may be supplied in any form which is compatible with the sintering process. For example, manganese may be supplied as metallic manganese, manganese oxide, manganese carbonate or the like. Manganese may be present in the powder mixture in an amount in the range 0.1% to 0.75% by weight, and preferably in an amount of about 0.5% by weight.

The powder composition optionally comprises one or more additives selected from the additives used in the capacitive layer of X7R or X8R capacitors, as described above. Additives may be supplied in any appropriate form, such as an oxide, carbonate, or the like.

Preferably, the dielectric material is prepared as a hybrid material. In this embodiment, the powder composition comprises a first powder of a first ceramic material comprising strontium titanate and bismuth ferrite, and a second powder comprising an X7R or X8R material. The X7R or X8R materials useful in the practice of the invention comprise barium titanate and one or more dopants. A person skilled in the art will be familiar with the formulation of X7R and X8R materials.

A preferred X7R material comprises about 94% barium titanate, about 2% niobium oxide, about 1.5% bismuth oxide, about 1% calcium carbonate, about 1% manganese carbonate, and about 0.5% silicon oxide. An alternative X7R material comprises about 94% barium titanate, about 2.5% neodymium oxide, about 1.5% zinc oxide, about 1% niobium oxide and about 1% silicon oxide.

Figure 1:
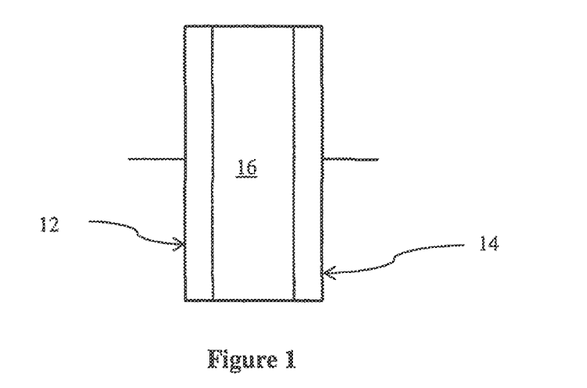
FIG. 1 is a schematic diagram of a capacitor.

In another aspect, the present invention provides a capacitor (100) comprising a first electrode (12), a second electrode (14), and a capacitive layer (16) disposed between the first electrode (12) and the second electrode (14), wherein the capacitive layer (16) comprises the dielectric material of the invention as described above.

Figure 2:
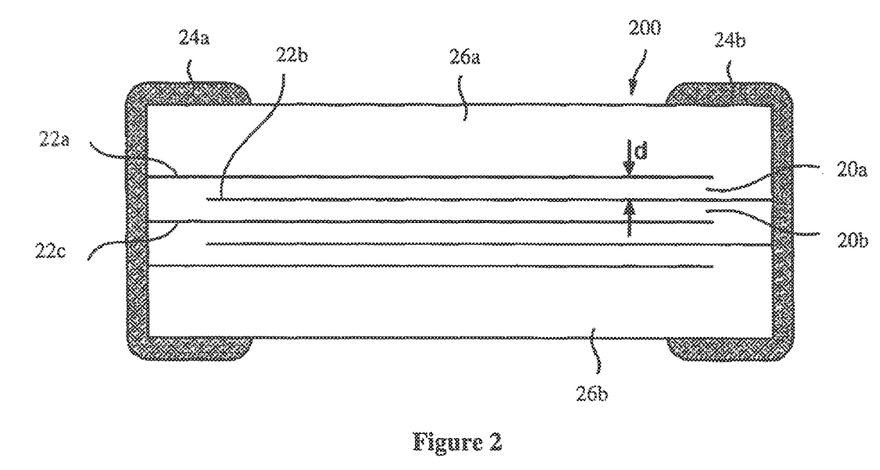
FIG. 2 is a schematic diagram of a multilayer capacitor.

The capacitor may be in the form of a multilayer capacitor (200) as shown in FIG. 2. A multilayer capacitor is formed of a plurality of capacitive layers 20a, 20b etc., formed between respective pairs of electrodes. For example, the layer 20a lies between electrodes 22a, 22b and the layer 20b lies between electrodes 22b, 22c, etc. In the illustrated structure, alternate electrodes are secured to respective terminating caps 24a, 4b. The thickness of each capacitive layer is denoted d. Where the combined thicknesses of the capacitive layers do not make up the full depth of the capacitor, bulk layers (illustrated as 26a and 26b) can be provided. The overall depth of the capacitor may for example be determined by a required external package size.

The capacitive layers are formed of the dielectric material of the invention as described above. The electrodes may be formed of a suitable precious or base metal. The terminating caps 24a, 24b comprise a termination material, which may be of electroplated silver, electroplated copper, Pd/Ag or any suitable material. Preferably, the termination material comprises silver and an epoxy polymer.

Figure 3:
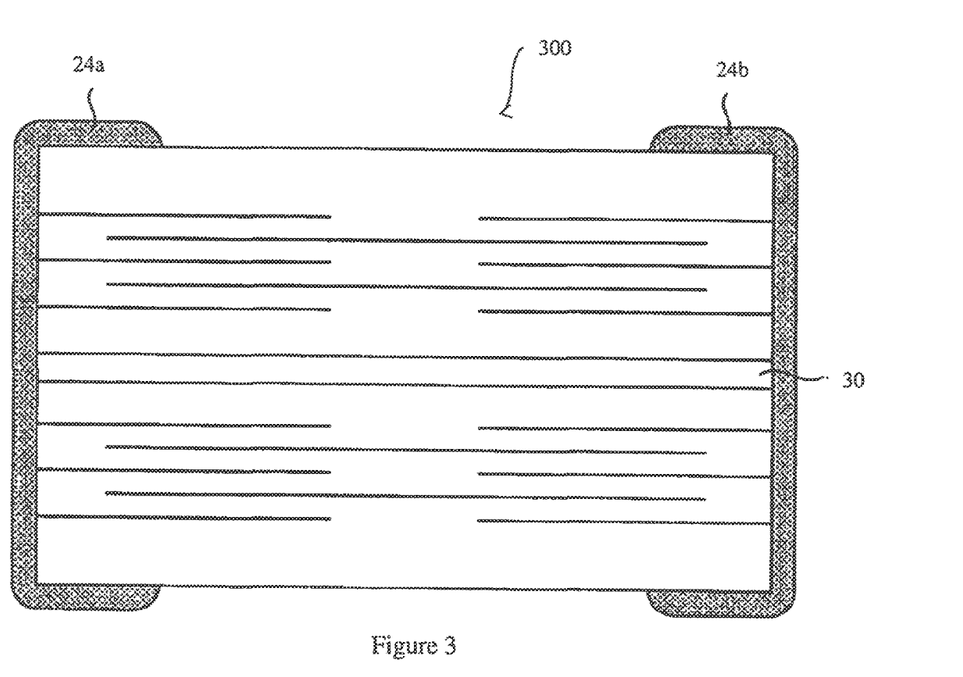
FIG. 3 is a schematic diagram of a multilayer capacitor having a stress reducing layer.

Optionally, the multilayer capacitor is provided as a component of a capacitive structure (300) as shown in FIG. 3 and described in WO2013/186172. The capacitive structure may comprise the multilayer capacitor and a second component, wherein the multilayer capacitor and the second component are arranged in a stack separated by a stress reducing layer (30) having a supporting structure with an open mesh in which air acts to reduce the transmissibility of cracks through the stress reducing layer. The second component may be a capacitor, a varistor or an inductive component.

The structure of the capacitor may be varied depending on the required capacitance value and maximum working voltage.

The thickness of the capacitive layer(s) may be in the range 10 μm to 200 μm, preferably 10 μm to 100 μm, more preferably 20 μm to 70 μm.

If the capacitor is a multilayer capacitor, the number of electrodes may be varied. The number of electrodes which is any suitable number but is typically between 20 and 100 and can extend up to 300. The thickness of the bulk layer, if present, may be between 65 and 200 μm, and more preferably between 70 and 150 μm.

The overall dimensions of the capacitor may be varied in accordance with standard practices known in the art. For example, the capacitor may have dimensions in the following ranges:

a length of at least 1 mm, and optionally a length in the range 3.2 mm to 20.5 mm or 2 to 25 mm;

a width of at least 0.5 mm, and optionally a width in the range 1.6 mm to 15.5 mm or 1 mm to 20 mm; and a depth of at least 0.5 mm, and optionally a depth in the range 1.6 mm and 4 mm, or up to a maximum of 5 mm.

One embodiment of a capacitor has a width of 5 mm, a length of 5.7 mm and thickness of 2.6 mm or 3.2 mm.

The capacitors of the present invention may be operably linked to an electric motor. The electric motor is optionally part of the drive train of an electric vehicle or a hybrid vehicle.

The capacitors of the present invention may be operably linked to an integrated circuit. The integrated circuit may be a component of a sensor system, a photovoltaic cell, or the like.

The capacitors of the invention preferably comply with the X7R or X8R industry standards.

The capacitors of the present invention typically have a dissipation factor less than or equal to 3%, or less than or equal to 1%, or less than or equal 0.4%, or most preferably less than or equal to 0.2%. Dissipation factors were measured using an alternating current at a frequency of 1 kHz and a root mean square voltage of 1 V.

In a still further aspect the present invention prides a method of manufacturing a capacitor. The method comprises providing a first electrode, depositing a slurry comprising a powder composition for forming a capacitive layer, depositing a second electrode; and sintering the resulting structure to form the capacitor, wherein the powder composition comprises bismuth ferrite, strontium titanate and an additive, and wherein the additive comprises barium titanate.

The capacitor is formed as a sequence of layers. A layer of the powder composition is put down onto a first electrode (which might involve a number of layering steps by screen printing, for example), allowed to dry, and an electrode layer is formed. If the capacitor is a static capacitor, subsequent layers of the powder composition and further electrode layers are deposited.

If the capacitor is a static capacitor comprising a stress relieving layer, a blended layer is put down which comprises a blend of carbon and a base ceramic material. The upper component of the capacitive structure can then be formed in a similar manner to the lower component. The sintering step dries the layers and forms the dielectric material in situ. The sintering step burns off the carbon to form the porous stress-relieving layer.

The method of manufacturing the capacitor preferably involves the hybridisation of two or more materials. It is believed that hybridisation produces dielectric materials with particularly useful properties, such as an improved dissipation factor and improved tolerance of higher voltages. Hybridisation involves preparing powders of two or more dielectric materials, optionally by milling, blending the powders, and sintering the resulting mixture. Preferably, the mixture is sintered in situ during the manufacture of the capacitor.

Hybridisation may be achieved by selecting the components of the powder composition. For example, the powder composition may comprise a first powder of a first ceramic material, the first ceramic material comprising bismuth ferrite and strontium titanate; and a second powder of a second ceramic material, the second ceramic material comprising barium titanate. The second ceramic material may consist essentially of barium titanate, but preferably comprises one or more dopants.

Most preferably, the second ceramic material is an X7R or X8R material.

A preferred X7R material comprises about 94% barium titanate, about 2% niobium oxide, about 1.5% bismuth oxide, about 1% calcium carbonate, about 1% manganese carbonate, and about 0.5% silicon oxide. An alternative X7R material comprises about 94% barium titanate, about 2.5% neodymium oxide, about 1.5% zinc oxide, about 1% niobium oxide and about 1% silicon oxide.

Preferably, the powder composition further comprises a third powder of a third dielectric material, wherein the third ceramic material comprises bismuth ferrite and strontium titanate, and wherein the amounts of bismuth ferrite and strontium titanate present in the ceramic material are different to the amounts of bismuth ferrite and strontium titanate present in the second dielectric material.

The second ceramic material may be present in the powder composition in an amount in the range 5% to 25% by weight, and preferably 8% to 12% by weight or 18% to 22% by weight.

The first ceramic material preferably comprises strontium titanate in an amount in the range 75% to 85% by weight and the third ceramic material preferably comprises strontium titanate in an amount in the range 55% to 65% by weight. Each of the first ceramic material and the third ceramic material preferably comprise manganese in an amount of at least 0.1% by weight, and preferably in an amount in the range 0.25% to 0.75% by weight.

In yet another aspect the present invention provides the use of an additive to improve the lifetime and/or to reduce the dissipation factor of a capacitor, wherein the additive is a component of a dielectric material provided in a capacitive layer of the capacitor, wherein the capacitive layer comprises strontium titanate and bismuth ferrite, and wherein the additive comprises barium titanate.

The invention is further described in the following Examples. It will be understood that the Examples are provided for the purposes of illustration. The scope of the invention is defined by the claims.

EXAMPLES

Example 1: Preparation of Capacitors

Capacitors comprising the dielectric materials shown in Table 1 were prepared in accordance with a standard experimental protocol. Compositions for forming the electrodes and capacitive layers were deposited sequentially by screen printing on to an appropriate substrate. The resulting structure was then sintered to form the capacitor. To produce hybrid materials, constituent materials were milled and blended to produce the material for forming the capacitive layer.

TABLE 1 materials used in capacitors

| Material | Constituents |
|---|---|
| Comparative Material A | 80% $SrTiO_3$, 19.5% $BiFeO_3$, 0.5% Mn |
| Comparative Material B | 60% $SrTiO_3$, 39.5% $BiFeO_3$, 0.5% Mn |
| Comparative Material C | Hybrid of 75% comparative material A and 25% comparative material B |
| Comparative Material D | 94% BaTiO3, 2.5% $Nd_2O_3$, 1.5% ZnO, 1% $Nb_2O_3$, and 1% $SiO_2$. |
| Comparative Material E | 94% $BaTiO_3$, 2% $Nb_2O_3$, 1.5% $Bi_2O_3$, 1.0% $CaCO_3$, 1% $MnCO_3$, and 0.5% $SiO_2$. |
| Comparative Material F | 94.9% $BaTiO_3$, 2% $Bi_2O_3$, 1.5% PbO, 0.3% CoO, 0.8% ZnO and 0.5% $B_2O_3$. |
| Material 1 | Hybrid of 67.6% comparative material A, 22.5% comparative material B, and 9.9% $BaTiO_3$ |
| Material 2 | Hybrid of 67.6% comparative material A, 22.5% comparative material B, and 9.9% comparative material E |
| Material 3 | Hybrid of 45% comparative material A, 45% comparative material B and 10% comparative material E |
| Material 4 | Hybrid of 60% comparative material A, 30% comparative material B and 10% comparative material E |
| Material 5 | Hybrid of 40% comparative material A, 40% comparative material B, and 20% comparative material E |

Comparative materials A, B and C are materials as described in International patent application publication no. 2013/144637.

Comparative materials D, E and F are commercially-available high-K, mid-K and stable X7R materials, respectively.

Materials 1 to 5 are materials in accordance with the present invention.

Example 2: K and Residual K

The relative permittivity K and residual K of capacitors produced in accordance with Example 1 were characterised.

The K value of the capacitors was measured in the absence of an applied voltage. Capacitance values at various applied voltages were determined. Capacitance values were measured using an alternating current at a frequency of 1 kHz. All measurements were performed at a temperature of 25° C. Residual K was calculated in accordance with the formula below:

$$\text{Residual } K = K_0 X \frac{C_V}{C_0}$$

Figure 4:
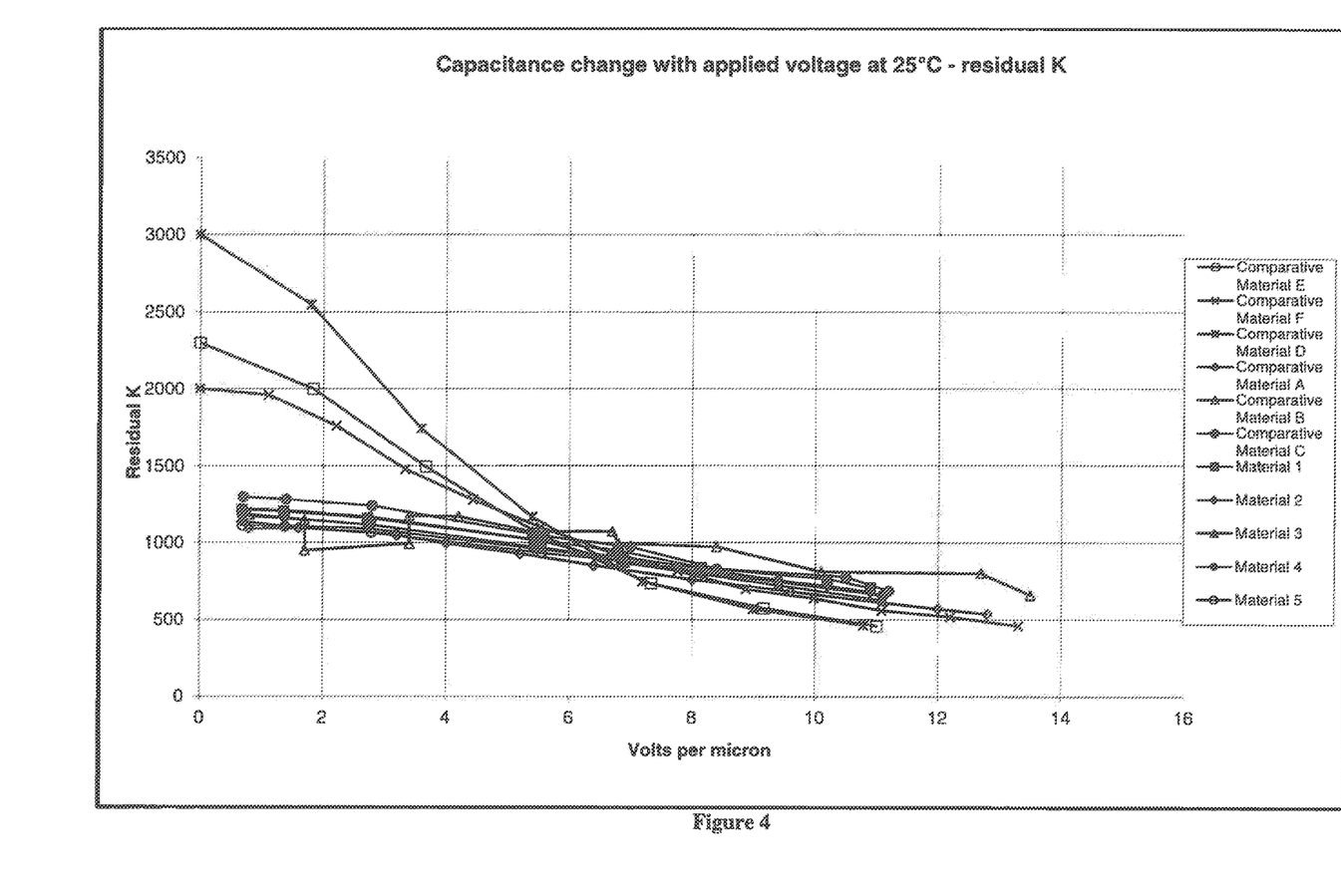
FIG. 4 is a plot of residual K against applied voltage for capacitors constructed using a series of dielectric materials.

The variation of residual K with the applied voltage is shown in FIG. 4. The measured K values and residual K values at an applied voltage of 10 V/μm are shown in Table 2, below.

TABLE 2

K and residual K values for capacitors of Example 1

| Material present in capacitive layer | K | Residual K at 25° C. and 10 V/μm |
|---|---|---|
| Comparative Material E | 2400 | 540 |
| Comparative Material F | 2000 | 640 |
| Material 1 | 1220 | 770 |
| Material 2 | 1140 | 730 |
| Material 3 | 1250 | 710 |
| Material 4 | 1200 | 740 |
| Material 5 | 1150 | 730 |

The data presented above demonstrate that capacitors of the invention show a lower reduction in capacitance in response to the applied voltage than capacitors constructed using conventional X7R materials.

Example 3: Temperature Capacitance Change

Figure 5:
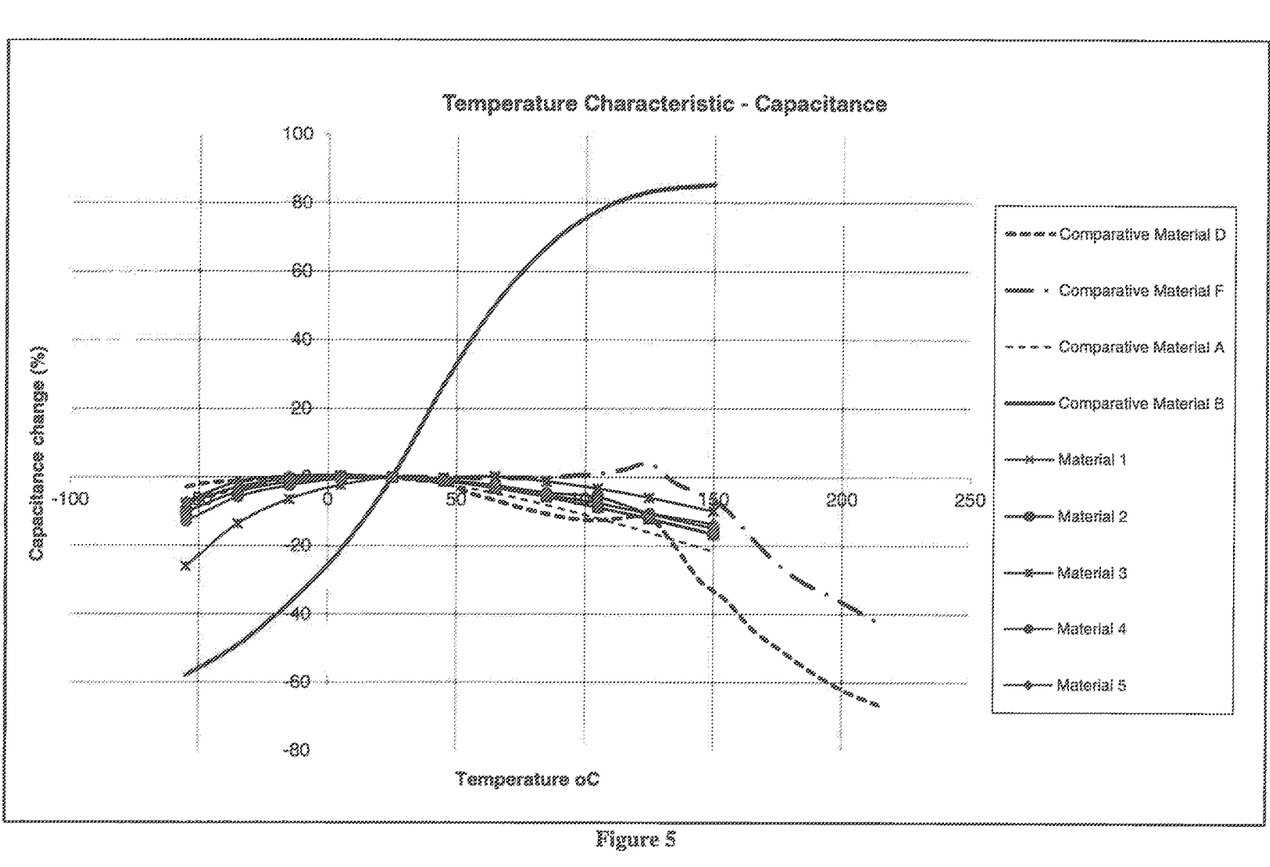
FIG. 5 is a plot of capacitance change against temperature for a series of capacitors comprising various dielectric materials.

The capacitance of capacitors produced in accordance with Example 1 was measured as a function of temperature. Capacitance was determined using an alternating current at a frequency of 1 kHz and at a root mean square voltage of 1 V. The results of these experiments are set out in Table 3 and are further illustrated in FIG. 5. To provide a measure of the overall performance of the capacitors over the full temperature range, an average percentage variation was calculated. No results were calculated for comparative capacitors E and F as no measurements could be taken at 200° C. due to component failure.

TABLE 3 temperature capacitance change for various capacitors

| Material present in capacitive layer | Temperature capacitance change relative to 25° C. at various temperatures/% | | | | Average variation |
|---|---|---|---|---|---|
| | −55 C. | 125 C. | 150 C. | 200 C. | |
| Comparative Material A | −17 | −15 | −19.5 | −27 | −19.6 |
| Comparative Material B | −52 | 106 | 115 | 122 | 72.8 |
| Comparative Material C | −35 | −7 | −12 | | |
| Comparative Material E | −8 | 7 | −10 | | |
| Comparative Material F | −3 | −7 | Est-25 | | |
| Material 1 | −8 | −12 | −17 | −27 | −6.3 |
| Material 2 | −11 | −12 | −16 | 14 | −14.8 |
| Material 3 | −26 | −6 | −10 | −17 | −15.3 |
| Material 4 | −15 | −10 | −14 | −22 | −12.8 |
| Material 5 | −8 | −10 | −13 | −20 | −19.6 |

The capacitors according to the invention were found to have an improved response to temperature than the comparative capacitors.

As expected, capacitors comprising comparative materials E and F did not function at 200° C., rendering these capacitors unsuitable for use at high temperatures.

Capacitors comprising materials of the invention underwent a smaller average variation in capacitance over the temperature range investigated, indicating that they have an improved temperature response in comparison to capacitors of the prior art. Devices constructed using capacitors of the invention would therefore have improved reliability since the capacitors would perform consistently over a wide temperature range.

Example 4: Voltage Capacitance Change

Capacitance can vary with applied voltage. The response of the capacitors produced in accordance with Example 1 to varying applied voltages was therefore investigated at 25° C. and at 125° C. The data obtained are presented in FIG. 6 and FIG. 7, respectively.

Figure 6:
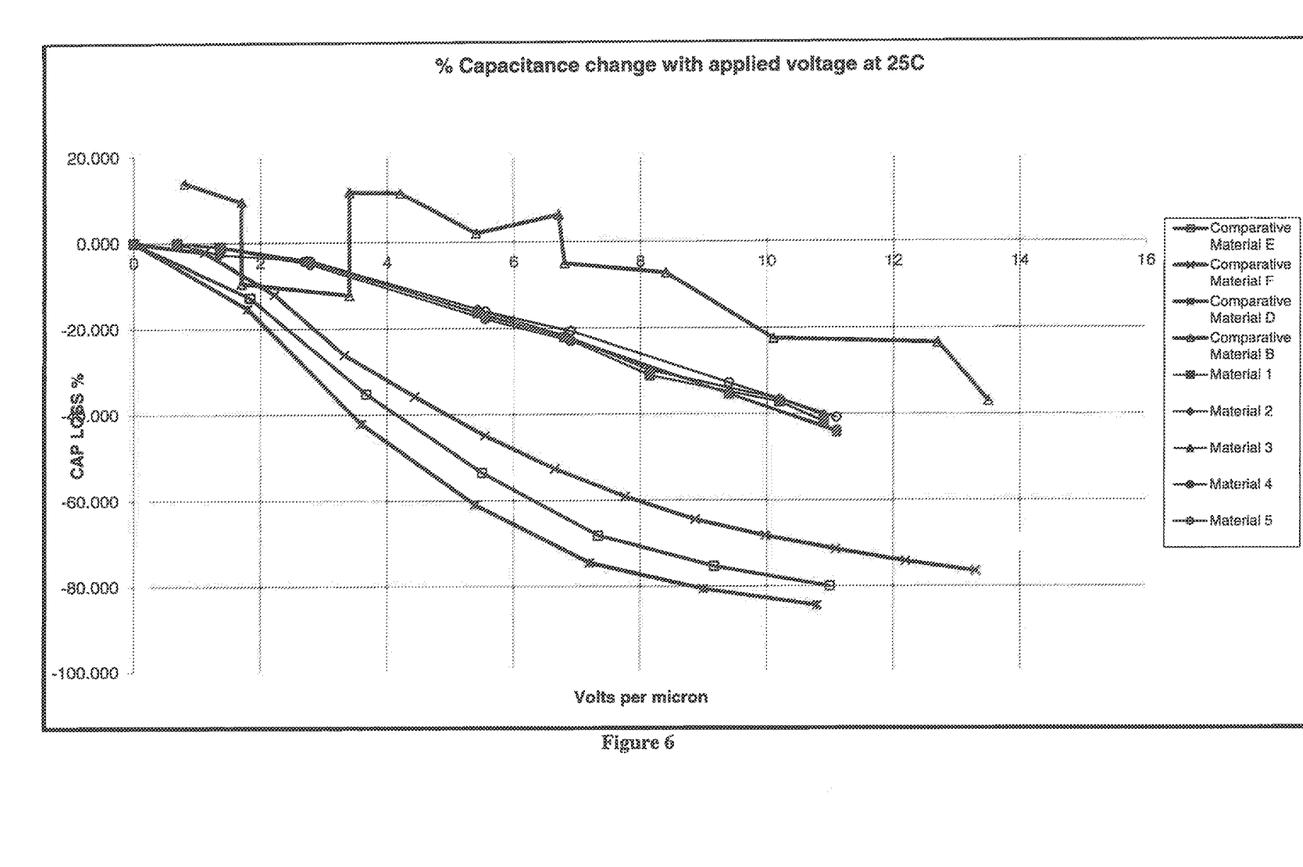
FIG. 6 is a plot of capacitance change against applied voltage at 25° C. for a series of capacitors constructed using various dielectric materials.
Figure 7:
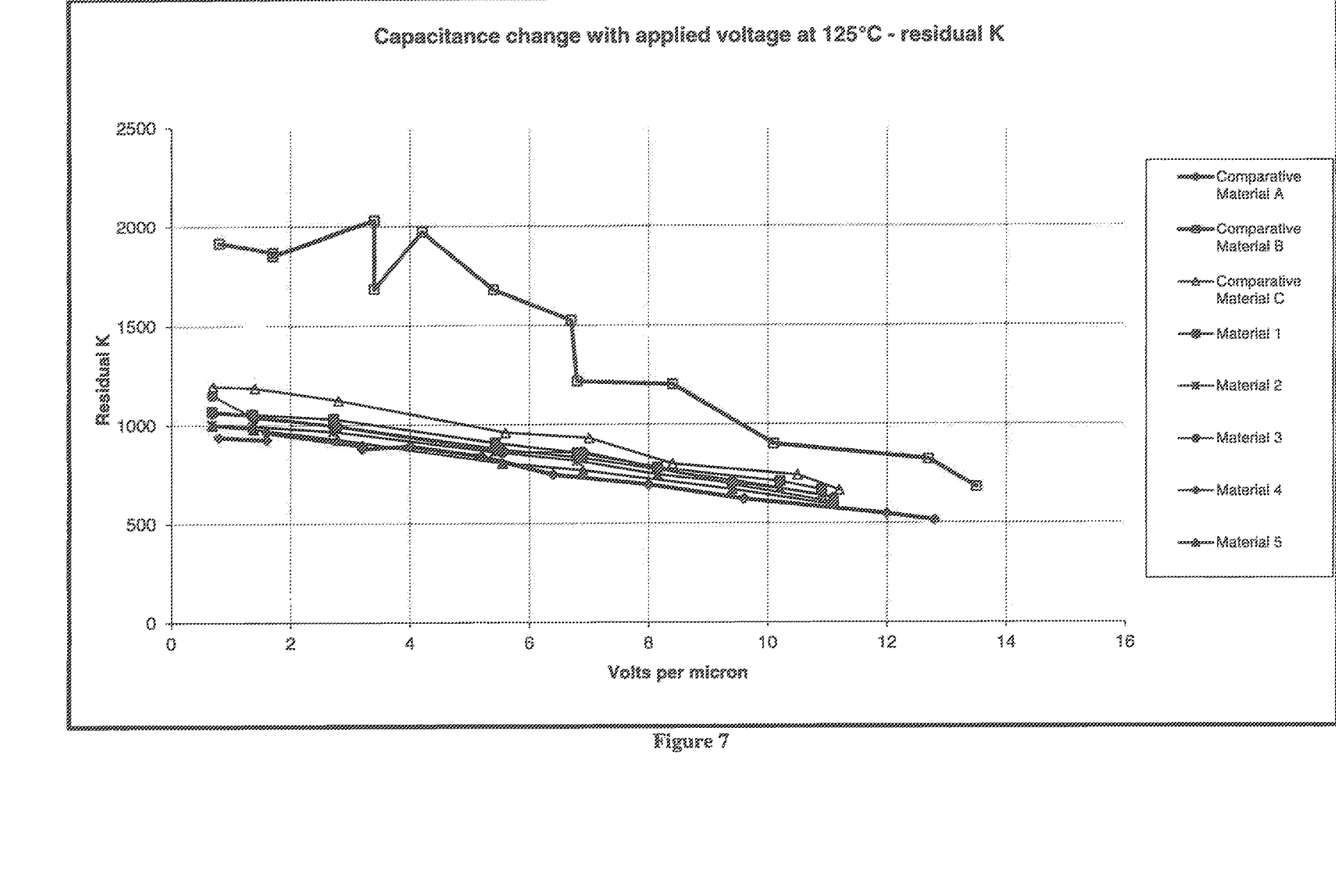
FIG. 7 is a plot of capacitance change with applied voltage at 125° C. for capacitors constructed using a series of dielectric materials.

As shown in FIG. 6, capacitors produced in accordance with the invention were subject to a smaller change in capacitance with applied voltage than comparative capacitors D to F, constructed using conventional materials. Capacitors according to the invention are therefore better suited to high voltage applications than the conventional materials.

FIG. 6 shows that the voltage capacitance change of capacitors of the invention was similar to that of comparative capacitors A and C.

Unusual behaviour was noted for comparative capacitor B in all cases.

Example 5: Dissipation Factors

Dissipation factor is a measure of the rate of energy loss when an alternating current is applied to the capacitor. The dissipation factor is calculated using equation 1:

$$DF = \frac{\sigma}{\varepsilon \omega^2 C}$$

Where σ is bulk conductivity of the dielectric, ω is the angular frequency of the alternating current, ε is the permittivity of the dielectric and C is the capacitance of the capacitor. In the context of the present disclosure, dissipation factors are measured at an alternating current frequency of 1 kHz and a root mean square voltage of 1 V. Capacitance was recorded using an LCR meter.

The data obtained are presented in Table 4.

TABLE 4 dissipation factors for various capacitors

| Material present in capacitive layer | Df % |
|---|---|
| Comparative Material A | 0.3 |
| Comparative Material B | 2.6 |
| Comparative Material C | 0.4 |
| Comparative Material D | 0.8 |
| Comparative Material E | 1.3 |
| Material 1 | 0.2 |
| Material 2 | 0.25 |
| Material 3 | 0.35 |
| Material 4 | 0.27 |
| Material 5 | 0.18 |

The dissipation factors of capacitors of the invention were smaller than those of capacitors constructed using conventional materials. This demonstrates that the capacitors of the invention have improved efficiency.

Example 6: Variation of Dissipation Factor with Temperature

To characterise further the response of the capacitors to variations in temperature, a series of dissipation factor measurements were conducted over the temperature range −55° C. to 200° C. The results of these experiments are presented in FIG. 8.

Figure 8:
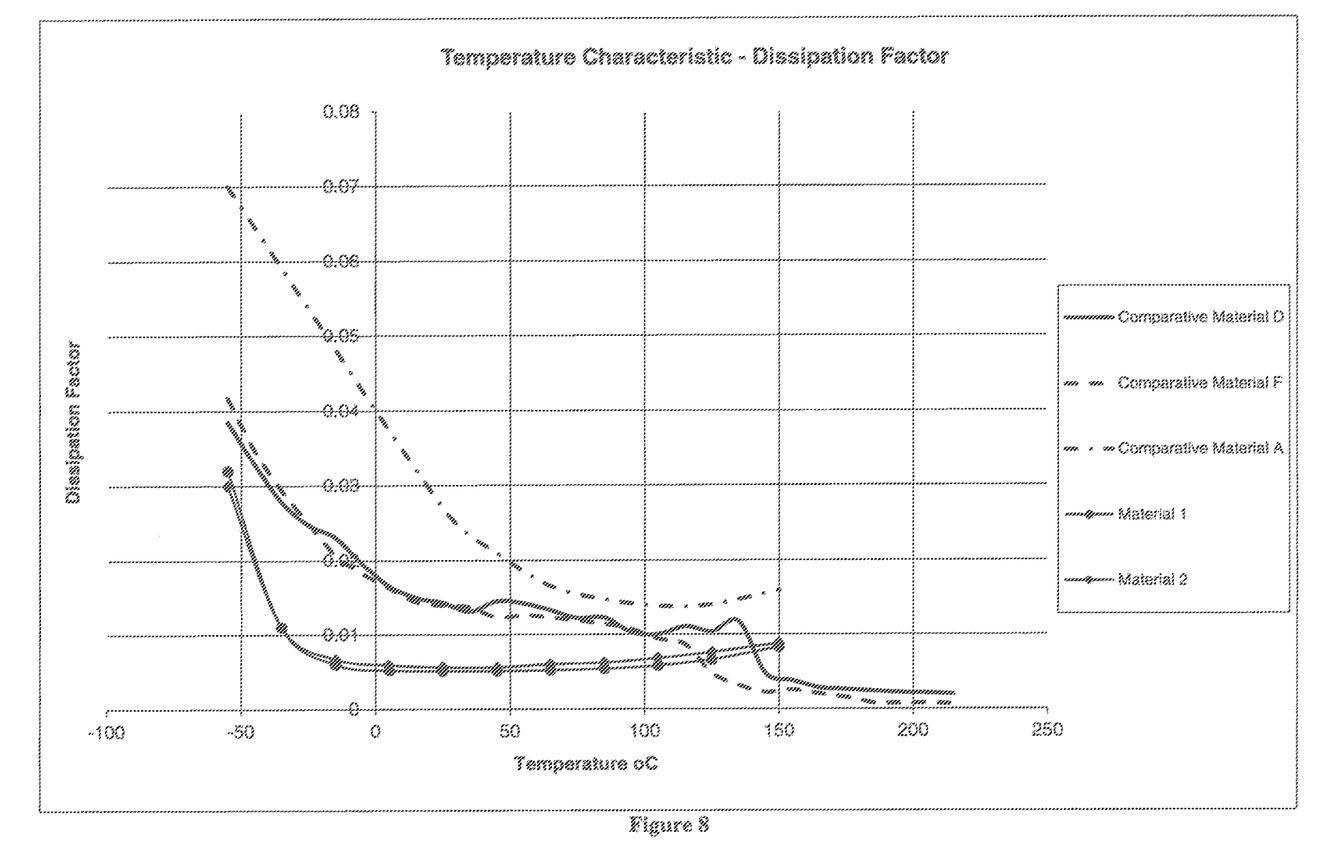
FIG. 8 shows the dissipation factor of a series of capacitors as a function of temperature.

The data demonstrate that the capacitors of the invention have lower dissipation factors than the comparative capacitors over the temperature range −55° C. to 125° C. Capacitors constructed using comparative materials D and F appeared to show low dissipation factors above about 125° C. However, comparative materials D and F are X7R materials, and are not rated to temperatures above 125° C., and as noted in Example 3 component failure occurs when capacitors constructed used comparative material F are exposed to high temperature.

The results for comparative materials D and F above 125° C. are therefore believed to be erroneous.

The dissipation factors of the capacitors of the invention were essentially constant over the range −15° C. to 150° C., in contrast to the comparative capacitors which displayed considerable variations in efficiency with temperature. Capacitors of the invention are therefore well-suited for applications where variations in temperature are likely to be encountered. Capacitors of the invention may therefore allow the construction of circuits and devices with improved reliability.

The invention claimed is:

1. A dielectric material suitable for use in an electronic component, which material comprises bismuth ferrite, strontium titanate and an additive, wherein the additive comprises barium titanate, and wherein the strontium titanate is present in the material in an amount in the range 45% to 75% by weight.

2. The dielectric material of claim 1, further comprising manganese.

3. The dielectric material of claim 1, further comprising at least one of i) a rare earth metal and ii) one or more components selected from cobalt, magnesium, zinc, boron, calcium, silicon and niobium.

4. The dielectric material of claim 1, wherein the additive is present in the material in an amount of up to 50% by weight.

5. The dielectric material of claim 1, wherein the strontium titanate is present in the material in an amount in the range 55% to 65% by weight.

6. A capacitor comprising a first electrode, a second electrode, and a capacitive layer disposed between the first electrode and the second electrode, wherein the capacitive layer comprises the dielectric material of claim 1.

7. The capacitor of claim 6, wherein the capacitor is a multilayer capacitor.

8. The capacitor of claim 6, further comprising a termination material disposed on at least one of the electrodes, wherein the termination material comprises silver and an epoxy polymer.

9. The capacitor of claim 6, wherein the capacitive layer has a thickness in the range 10 μm to 200 μm.

10. The capacitor of claim 6, wherein the capacitor is operably linked to an electric motor or an integrated circuit.

11. A method of manufacturing a dielectric material, comprising:
    a. providing a powder composition; and
    b. sintering the powder composition to form the dielectric material,
    wherein the powder composition comprises bismuth ferrite, strontium titanate and an additive, wherein the additive comprises barium titanate, and wherein the strontium titanate is present in the powder composition in an amount in the range 45% to 75% by weight.

12. The method of claim 11, wherein the powder composition comprises:
    a first powder of a first ceramic material, wherein the first ceramic material comprises bismuth ferrite and strontium titanate; and
    a second powder of a second ceramic material, wherein the second ceramic material comprises bismuth ferrite and at least one dopant.

13. The method of claim 11, wherein step b is carried out at a temperature in the range 950° C. to 1150° C.

14. The method of claim 11, wherein the powder composition has a mean particle diameter as measured by laser diffraction spectroscopy in the range 0.2 μm to 20 μm.

15. The method of claim 11, wherein barium titanate is present in the powder composition in an amount of up to 50% by weight.

16. The method of claim 11, wherein the strontium titanate is present in the powder composition in an amount in the range 55% to 65% by weight.

17. The method of claim 11, wherein the powder composition further comprises at least one of i) manganese ii) a rare earth metal and iii) one or more of cobalt, magnesium, zinc, boron, calcium, silicon and niobium.

18. A method of manufacturing a capacitor, which method comprises:
    a. providing a first electrode;
    b. depositing a slurry comprising a powder composition for forming a capacitive layer;
    c. depositing a second electrode; and
    d. sintering the resulting structure to form the capacitor;
    wherein the powder composition comprises bismuth ferrite, strontium titanate and an additive, wherein the additive comprises barium titanate, and wherein the strontium titanate is present in the powder composition in an amount in the range 45% to 75% by weight.

19. The method of claim 18, wherein the powder composition comprises:
    a. a first powder of a first ceramic material, the first ceramic material comprising bismuth ferrite and strontium titanate; and
    b. a second powder of a second ceramic material, the second ceramic material comprising barium titanate and at least one dopant.

20. The method of claim 19, wherein the second ceramic material is an X7R material or an X8R material.

21. The method of claim 19, wherein the second powder is present in the powder composition in an amount in the range 5% to 2.5% by weight.

22. The method of claim 19, wherein the first ceramic material further comprises manganese.

23. The method of claim 19, wherein the powder composition further comprises a third powder of a third ceramic material, wherein the third ceramic material comprises bismuth ferrite and strontium titanate, and wherein the amounts of bismuth ferrite and strontium titanate present in the third ceramic material are different to the amounts of bismuth ferrite and strontium titanate present in the second ceramic material.

24. The method of claim 18, wherein the slurry is deposited by screen printing and/or wherein the second electrode is deposited by screen printing.

25. The method of claim 18, wherein at least one of (i) the barium titanate is present in the powder composition in an amount of up to 50% by weight and (ii) the strontium titanate is present in the powder composition in an amount in the range 55% to 65% by weight.

26. The method of claim 18, wherein the powder composition further comprises at least one of i) manganese and ii) a rare earth metal.

* * * * *

UNITED STATES PATENT AND TRADEMARK OFFICE
CERTIFICATE OF CORRECTION

PATENT NO. : 9,847,176 B2
APPLICATION NO. : 15/120478
DATED : December 19, 2017
INVENTOR(S) : Knuth Albertsen It is certified that error appears in the above-identified patent and that said Letters Patent is hereby corrected as shown below:

In Column 3 at Line 52, Change "strontrium" to --strontium--.

In Column 6 at Line 36, Change "titante," to --titanate,--.

In Column 7 at Line 24, Change "4b" to --24b--.

In Column 12 at Lines 3-4, Change "$DF - \dfrac{\sigma}{\varepsilon\omega^2 C}$" to --$DF = \dfrac{\sigma}{\varepsilon\omega^2 C}$--.

In Column 14 at Line 32, In Claim 21, change "2.5%" to --25%--.

Signed and Sealed this
Twenty-first Day of August, 2018

Andrei Iancu
*Director of the United States Patent and Trademark Office*